G. P. Gordon.
Printing Press.
No. 581. Reissued Aug. 10. 1858.
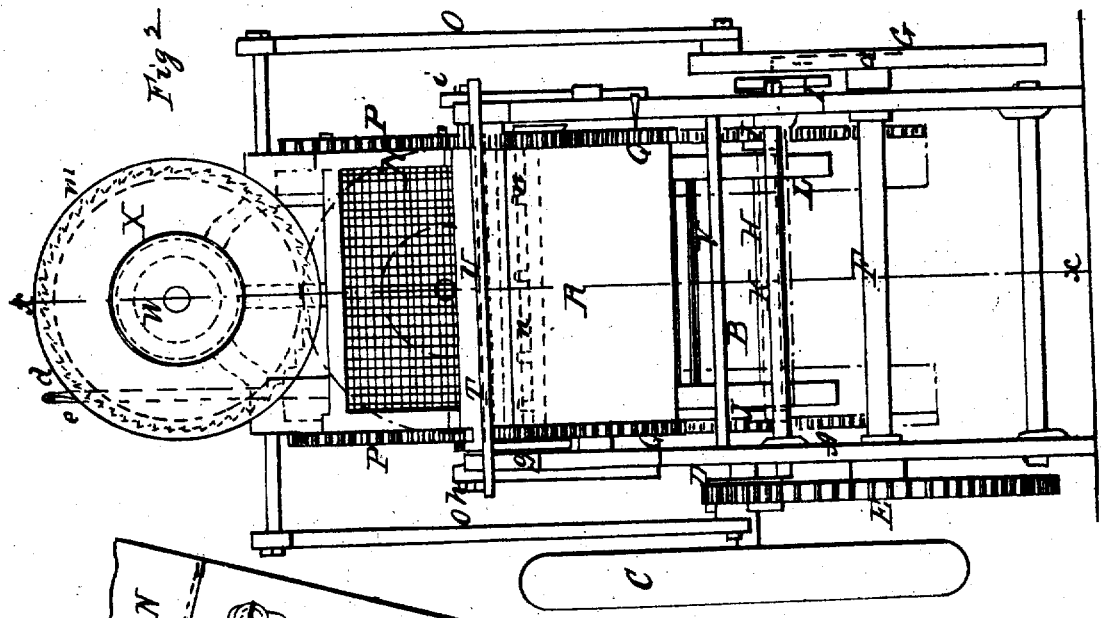
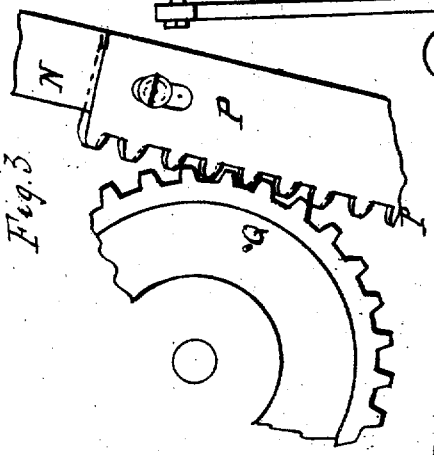
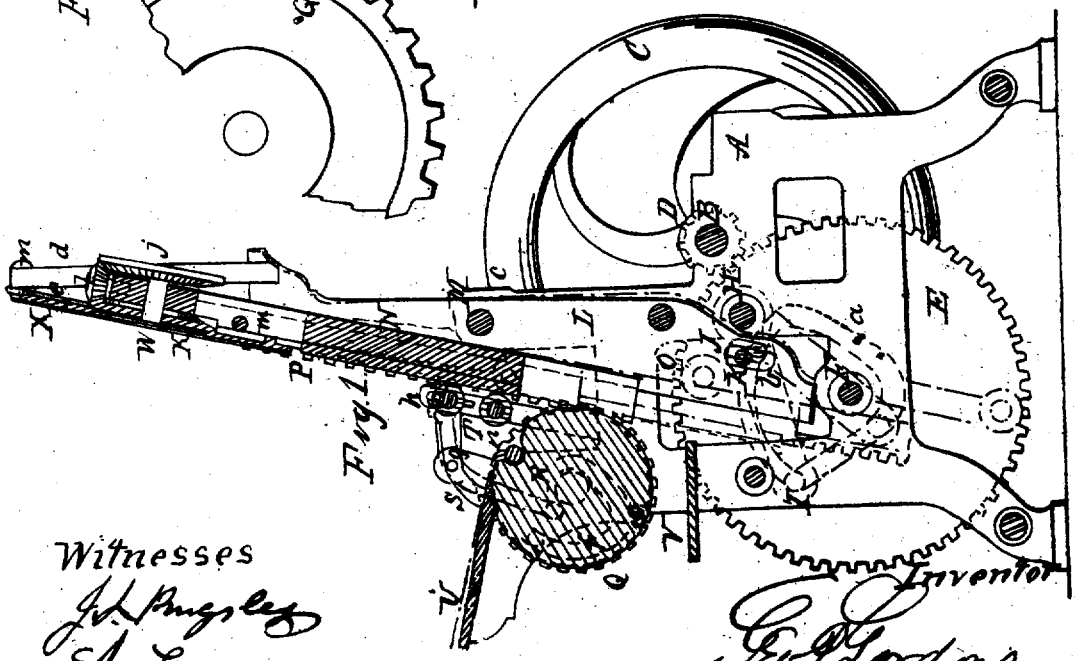
Witnesses
J. L. Bugsley
A. Turner
Inventor
Geo. P. Gordon
THE PORRIS PETERS CO., WASHINGTON, D. C.

UNITED STATES PATENT OFFICE.

GEORGE P. GORDON, OF NEW YORK, N. Y.

IMPROVED PRINTING-PRESS.

Specification forming part of Letters Patent No. 14,016, dated January 1, 1856; Reissue No. 581, dated August 10, 1858.

*To all whom it may concern:*

Be it known that I, GEORGE P. GORDON, of the city, county, and State of New York, have invented a new and useful Improvement in Printing-Presses; and I do hereby declare the following to be a full, clear, and exact description of the same, reference being had to the annexed drawings, making a part of this specification.

Like references always denote the same parts in all of the figures of the drawings, Figure 1 being a vertical section; Fig. 2, a front elevation; Fig. 3, a detached side view of the toothed wheels on the cylinder and the racks on the sides of the form-bed, or the bed upon which the types are placed, thus forming one complete body (for the time being) of the types and the bed upon which they rest.

The nature of my invention may be understood as follows:

First. The employment or use of two disks, one being annular and the other circular, each so fitted to the other that while one is revolving one way (that is, in one direction) the other is moving in a precisely opposite direction. The circular disk is placed within the annular ring in order to effect the object of allowing the two disks to rotate each in a contrary direction to the other, this for the purpose of distributing the ink, which is to be by these tables conveyed to the rollers which ink the form of types.

Second. In providing a rotating reciprocating cylinder and reciprocating form or type bed so arranged that at the proper time it will impinge, and thus give the impression to the form at the proper time, as will be described.

Third. I employ a reciprocating form or type bed, which may be placed at any given angle, and thus used with a rotating cylinder so arranged as to rotate and reciprocate its motions by the arrangements to be described, in order to drop or pile the printed sheet at the desired place and in the proper time.

Fourth. I employ a set of one or more rollers, and imparting to said rollers an oblique vibrating motion over the disk and plate or annular ring for the purpose of giving an equal distribution of the ink.

To enable those skilled in the art to make and use my invention, I will describe its construction and operation.

A represents a properly-shaped frame to hold the different parts in position for the duties they have to perform.

B is the driving-shaft, having upon its end the fly-wheel C, and at the opposite end the pinion D, which gears into and drives the main wheel E. A shaft, F, has upon it the wheel G, said wheel having upon its side an irregular cam or groove, *a*, which groove is for the purpose of controlling the movement of the variable motion from one line to the others of the portions of the bed, this cam *a* in the face of the wheel G performing its proper part. The shaft F has a plain wheel upon its periphery; but upon it sside is a grooved cam, which is to control the movements of the arm I. The groove is shown at *a* as presented in the dotted lines, Figs. 1 and 2.

H is a shaft, having an arm, I, on one end. The outer end of this arm works by means of a stud in the cam *a* within the grooved cam G. The shaft H has also the two arms J J attached to it, and the outer arms, J, have a shaft, K, fitted in them, said shaft passing through slots *b b* in the lower end of an upright swinging frame, L, which is hung on a swinging frame, M, placed within the upper ends of uprights attached to the frame A. To one of the side pieces of the swinging frame L there is attached an upright, *d*, having a pawl, *e*, at its upper end.

N represents the type or form bed, which works upon guides or ways on the side pieces of the swinging frame. The form-bed is connected by pitmen *o o*, one at each side, to the toothed wheel E and wheel G, the pitmen being attached to said wheels near their peripheries, as clearly shown in Fig. 2.

To each side of the form or type bed N there is attached a rack, P, one of which is permanently fixed, while the second rack, P′, is made with slots, so that it may be adjusted for the purpose of always insuring full and complete gear with the segment, notwithstanding its movement to and from the point of contact or meeting of the face of the type with the sheet of paper upon the face of the cylinder or segment, and the withdrawal from such contact in the alternate movements which necessarily take place as the press assumes its various positions for the purpose of accomplishing its various operations. These racks gear into toothed wheels Q Q, which are attached one at each end of a cylinder, R, the shaft of which works in proper bearings in the front part of the frame A. The outer side of one of the toothed wheels Q has an irregular groove, *f*, made in it, in which groove the end of a lever, S, is fitted. This lever is attached to the frame by a pivot, *g*, and the opposite end of the lever is forked and encompasses the shaft of an ink-roller, T, the end of which adjoining the lever S is fitted in an oblong slot in an upright, *h*, attached to the frame. The opposite end of the roller T has its bearing in an upright, *i*, attached to the frame. The roller T is placed directly in front of the type or form bed and moves the inking-rollers, one or as many as may be required, these being fitted in the same uprights.

U represents a feed-board placed over the upper part of the cylinder R; and V is a fly-board placed underneath the cylinder.

To the upper part of the type or form bed N there is attached a circular disk, W, having a bevel-wheel, *j*, attached to its axis on its outer end. The plate W is encompassed by an annular disk, X, which has a bevel-geared rim, *k*, on its outer side, in which a pinion, *l*, gears, said pinion also gearing into the wheel *j* on the axis of the disk W. A rim, *m*, having ratchet-teeth cut in it, is also placed on the outer side of the disk X near its periphery. The cylinder R is provided with fingers *n*, to catch and hold the sheet of paper. These fingers are operated in the usual manner.

Operation: The two racks P P′ bear one against the upper edges of the teeth of one wheel Q, and the other rack against the other edges of the teeth of the other wheel, so that no play is allowed between the teeth of the racks and those of the wheels. This is effected by adjusting the rack P′ to a proper position. The sheets of paper to be printed are placed upon the feed-board U, and the form is secured to the bed N in any proper way. Motion is given the shaft B and a reciprocating motion is communicated to the type or form bed N by the pitmen *o o*. When the type or form bed reaches its highest point, the lower end of the swinging frame is thrown toward the cylinder by the shaft K, which receives its motion from the shaft H, the shaft H being operated by the arm I, the end of which works in the groove *a* in the side of the wheel G. The cylinder R has a rotating reciprocating motion given it by the racks P P′ and the toothed wheels Q Q. The sheets of paper are caught in the usual way by the fingers or grippers *n* on the cylinder, and as they are carried around between the cylinder and the form the impression is given. The cylinder then deposits the printed sheets upon the fly-board V.

Just before the type or form bed commences to move upward the shaft K throws the lower end of the swinging frame, and consequently the form, out from the cylinder, and the pawl *e* acts against the rim *m* and causes the annular disk X to revolve a given distance. The circular disk W is caused to rotate a corresponding distance in an opposite direction by means of the gearing, (see *j k l*.) The disks X W are supplied with ink from a fountain of common construction, and the rotation of the disks described serves to distribute it evenly upon said disks. Then one or all of the rollers are thrown in an oblique position, when in contact with the bed, by the lever S, which is operated by the irregular groove or cam *f* in the side of the wheel Q. As the form or type bed N descends, the two disks pass behind the rollers T, which become inked by their contact with the disks. The oblique vibratory movement causes the ink to be evenly distributed on the rollers. The form is inked while passing both up and down behind the rollers. By adjusting the rack P′ as shown the sheets of paper will be properly presented to the form and to the impression, which will not be "slurred," as all unnecessary play is thus taken up by the adjustment referred to, such adjustment compelling their movements always to work in perfect harmony one with the other. Thus all wear or other inaccuracy may be at once taken up by the adjustment.

A press constructed upon the principles here laid down is extremely simple, economical to manufacture, efficient, and rapid in its operation.

What I claim as my invention, and desire to secure by Letters Patent, is—

1. The arrangement and combination of a rotating disk, W, with an annular ring or outside disk, X, the two revolving each in an opposite direction to the other for the purpose of breaking up the ink, so that it shall by such contrary motions become evenly distributed, and thus imparted to the rollers which ink the form of types.

2. I claim moving the rollers T (one or more being used) for inking the form from the parallel position they necessarily assume for this purpose, changing to an oblique position, which shall give to them a lateral motion when in contact with the distributing-disks or some equivalent, for the purpose specified.

3. I claim the arrangement of a form-bed which alternately varies its motion during its reciprocating movement—viz., first, traveling under and in contact with a cylinder to give an impression, then being withdrawn from contact with the cylinder and remaining withdrawn during the return movement to prevent an impression, such bed reciprocating and at the same time alternating from one of these positions to the other, thus performing two separate and distinct motions, entirely independent of and in a contrary direction to each other, while remaining in gear with the cylinder, when such bed shall be used with a cylinder or its equivalent having a part revolution with a reciprocating movement.

4. I claim attaching to the reciprocating form or type bed an adjustible rack, as well as a stationary rack, which two racks shall play into gear upon a cylinder or segment of a cylinder, so that any and all wear or variation may at once be taken up by adjusting the movable rack, and by this means always cause the bed and cylinder, or segment of a cylinder, to work in harmony with each other and produce a clear and sharp impression, free from slur.

5. I do not claim placing a reciprocating bed in a vertical position, or any given angle from a horizontal position; but I do claim so placing the bed when used with a rotating reciprocating cylinder or segment of a cylinder which shall place or pile the sheets of printed paper upon the fly-board, as herein set forth and described.

GEO. P. GORDON.

Witnesses:
J. L. KINGSLEY,
A. TURNER.